US012760842B2

(12) United States Patent
Haberbusch et al.

(10) Patent No.: US 12,760,842 B2
(45) Date of Patent: Oct. 13, 2026

(54) FLIGHT STORAGE SYSTEM FOR CRYOGENIC FLUIDS

(71) Applicant: NEOEx Systems, Inc., Amherst, OH (US)

(72) Inventors: Mark S. Haberbusch, Amherst, OH (US); Alec D. Romesberg, Vienna, OH (US)

(73) Assignee: NEOEx Systems, Inc., Amherst, OH (US)

( * ) Notice: Subject to any disclaimer, the term of this patent is extended or adjusted under 35 U.S.C. 154(b) by 592 days.

(21) Appl. No.: 18/168,962

(22) Filed: Feb. 14, 2023

(65) Prior Publication Data

US 2024/0271754 A1 Aug. 15, 2024

(51) Int. Cl.
*F17C 9/00* (2006.01)
*H01M 8/04082* (2016.01)

(52) U.S. Cl.
CPC ........ *F17C 9/00* (2013.01); *F17C 2201/0119* (2013.01); *F17C 2203/0391* (2013.01); *F17C 2203/0629* (2013.01); *F17C 2203/0643* (2013.01); *F17C 2203/0646* (2013.01); *F17C 2203/0673* (2013.01); *F17C 2205/0338* (2013.01); *F17C 2221/012* (2013.01); *F17C 2223/0161* (2013.01); *F17C 2227/0302* (2013.01); *F17C 2227/0339* (2013.01); *F17C 2250/04* (2013.01); *F17C 2270/0189* (2013.01); *H01M 8/04208* (2013.01)

(58) Field of Classification Search
CPC .. F17C 9/02; F17C 2265/05; F17C 2209/228; F17C 2209/22; F17C 3/08
See application file for complete search history.

(56) References Cited

U.S. PATENT DOCUMENTS

| | | | |
|---|---|---|---|
| 1,869,487 | A | 8/1932 | Lefevre et al. |
| 3,603,480 | A | 9/1971 | Yie et al. |
| 3,946,572 | A | 3/1976 | Bragg |

(Continued)

FOREIGN PATENT DOCUMENTS

| | | | |
|---|---|---|---|
| CN | 216202460 | U | 4/2022 |
| EP | 0314738 | B1 | 12/1992 |

(Continued)

OTHER PUBLICATIONS

International Search Report and Written Opinion (ISRWO) corresponding to counterpart International Patent Application PCT/US2024/015649 mailed Jun. 20, 2024.

*Primary Examiner* — Brian M King
(74) *Attorney, Agent, or Firm* — Renner, Otto, Boisselle & Sklar, LLP

(57) ABSTRACT

An exemplary flight storage system for storing a cryogenic fluid and then discharging it as a vapor. The flight storage system includes an inner tank, a heat exchanger that is in fluid communication with the inner tank, an outer jacket assembly, and a cooling assembly. The storage system is configured to store high specific energy fuel such as liquid hydrogen, or other cryogenic fluids, for energy for propulsion use. The cooling assembly is configured to use the flow of the liquid hydrogen for cooling critical sensor packages The outer jacket assembly includes a first jacket cylinder and a second jacket cylinder. The outer jacket assembly further includes a first connector body 30 and a second connector body.

21 Claims, 9 Drawing Sheets

(56) References Cited

U.S. PATENT DOCUMENTS

| | | | | |
|---|---|---|---|---|
| 4,108,223 | A | 8/1978 | Hansel | |
| H297 | H | 7/1987 | Schultz | |
| 4,986,446 | A | 1/1991 | Montgomery et al. | |
| 5,243,821 | A * | 9/1993 | Schuck | F17C 7/04 62/50.1 |
| 5,269,468 | A | 12/1993 | Adiutori | |
| 5,301,723 | A | 4/1994 | Goode | |
| 5,353,849 | A | 10/1994 | Sutton et al. | |
| 5,404,923 | A | 4/1995 | Yamamoto et al. | |
| 5,505,237 | A | 4/1996 | Magne | |
| 5,548,962 | A | 8/1996 | Luger et al. | |
| 5,589,020 | A | 12/1996 | Varghese | |
| 5,771,946 | A | 6/1998 | Kooy et al. | |
| 5,971,040 | A | 10/1999 | McFarland | |
| 6,024,074 | A | 2/2000 | Koethe | |
| 6,089,226 | A * | 7/2000 | Gier | A61B 18/02 128/201.21 |
| 6,237,647 | B1 | 5/2001 | Pong et al. | |
| 6,269,848 | B1 | 8/2001 | Corfitsen | |
| 6,382,269 | B1 | 5/2002 | Tatsuno | |
| 6,513,837 | B2 | 2/2003 | Fujikawa et al. | |
| 6,923,008 | B2 | 8/2005 | Brook et al. | |
| 7,028,724 | B2 | 4/2006 | Cohen et al. | |
| 7,082,969 | B1 | 8/2006 | Hollerback | |
| 7,093,626 | B2 | 8/2006 | Li et al. | |
| 7,296,601 | B2 | 11/2007 | Webb | |
| 7,316,242 | B2 | 1/2008 | Porter et al. | |
| 8,056,860 | B2 | 11/2011 | Small et al. | |
| 8,164,302 | B2 | 4/2012 | Capizzo | |
| 8,393,362 | B1 | 3/2013 | Hollerback | |
| 8,667,690 | B2 | 3/2014 | Cajiga et al. | |
| 8,939,396 | B2 | 1/2015 | Geneste | |
| 8,991,444 | B2 | 3/2015 | Boutet et al. | |
| 9,181,078 | B2 | 11/2015 | Cajiga et al. | |
| 10,029,803 | B1 | 7/2018 | Larsen | |
| 10,429,857 | B2 | 10/2019 | Weaver et al. | |
| 10,773,822 | B2 | 9/2020 | Haberbusch et al. | |
| 10,981,666 | B1 | 4/2021 | Haberbusch et al. | |
| 2001/0054818 | A1 | 12/2001 | Fijukawa et al. | |
| 2004/0055642 | A1 | 3/2004 | Valentian | |
| 2010/0019090 | A1 | 1/2010 | Mouskis et al. | |
| 2015/0123462 | A1 | 5/2015 | Kamradt | |
| 2017/0050749 | A1 | 2/2017 | Pilskalns | |
| 2017/0341769 | A1 | 11/2017 | Haberbusch et al. | |
| 2018/0196418 | A1 | 7/2018 | Meier et al. | |
| 2018/0229852 | A1 | 8/2018 | Boss et al. | |
| 2018/0312390 | A1 | 11/2018 | Homann et al. | |
| 2019/0077521 | A1 | 3/2019 | Kelly et al. | |
| 2019/0211971 | A1 * | 7/2019 | Bollinger | F17C 13/086 |
| 2020/0180940 | A1 | 6/2020 | Rainville | |
| 2020/0239109 | A1 * | 7/2020 | Lee | F25J 1/0025 |
| 2023/0047425 | A1 * | 2/2023 | Heon | F17C 13/06 |

FOREIGN PATENT DOCUMENTS

| | | | |
|---|---|---|---|
| JP | S5248119 | B1 | 4/1977 |
| KR | 20220074609 | A1 | 6/2022 |
| WO | 2007059781 | A1 | 5/2007 |

* cited by examiner

FLIGHT STORAGE SYSTEM FOR CRYOGENIC FLUIDS

TECHNICAL FIELD

The present disclosure relates generally to aircraft fuel storage systems and more particularly a light-weight cryogenic fluid storage system for flight vehicles.

BACKGROUND

Flight vehicle aerodynamics dictate that all components in the vehicle be as light as possible when accomplishing their function in order to maximize propulsion effectiveness and the flight range of the vehicle. This includes components used in fuel systems required to operate propulsion and power units on the vehicle. One particular case to examine is a liquid hydrogen fuel system used to operate a fuel cell power system that then can be used to operate electric propulsion systems.

Liquid hydrogen fuel systems are different than the hydro-carbon fuel systems typically used on flight vehicles. To stay in a liquid state at pressures less than 100 psi, liquid hydrogen must be stored between −434° F. and −406° F. (14 K to 30 K), which is much lower than the storage temperature of hydro-carbon fuels, which is near ambient temperature. Liquid hydrogen storage systems must be designed to operate at these extreme temperatures. Liquid hydrogen is typically stored in insulated containers, such as dewars, in order to minimize heat leak into the liquid hydrogen that will prematurely boil away the liquid hydrogen before it is used by the power system. Commercial ground based dewars for storing cryogenic liquids are designed for strength and durability. They are typically constructed from heavy stainless steel as the primary material. Commercial dewar designs are, therefore, heavy, and not practical for use in flight systems.

The combination of a) light weight and b) extreme temperature operation design constraints creates challenges for the use of liquid hydrogen as fuel for flight vehicles.

SUMMARY

The innovation described herein takes into account the above requirements for storing and gasifying liquid hydrogen in a unique design that integrates and optimizes various subassemblies according to their required function to obtain a light-weight liquid hydrogen fuel flight storage system.

The present disclosure relates to a system for storing a cryogenic fluid and discharging a vapor. In accordance with an embodiment the system includes an inner tank, a heat exchanger in fluid communication with the inner tank, a cooling assembly, and an outer jacket assembly. The cooling assembly includes a cold plate heat exchanger and a bottom drain tube and a vapor return line fluidly connected to the inner tank and the cold plate heat exchanger such that liquid hydrogen from the inner tank feeds out the bottom drain tube and into the cold plate heat exchanger and vaporized hydrogen leaves the cold plate heat exchanger through the vapor return line to the inner tank.

The outer jacket assembly includes a first jacket cylinder and a second jacket cylinder. A first flange is affixed to the first jacket cylinder and a second flange is affixed to the second jacket cylinder. The outer jacket further includes a first connector body and second connector body, wherein the first connector body has a first face, and the second connector body has a second face, the connector bodies are configured such that they are disposed between the first and second flanges, when in a connected state the first face of the first connector body abuts the second face of the second connector body and at least one fastener connects the first and second flanges and the first and second connector bodies together. A first sealing ring is disposed between the first flange and the first connector body, and a second sealing ring disposed between the flange and second connector body. The outer jacket assembly encases the inner tank, the heat exchanger, and the cooling assembly.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF DRAWINGS

The annexed drawings show various aspects of the disclosure.

DETAILED DESCRIPTION

Figure 1:
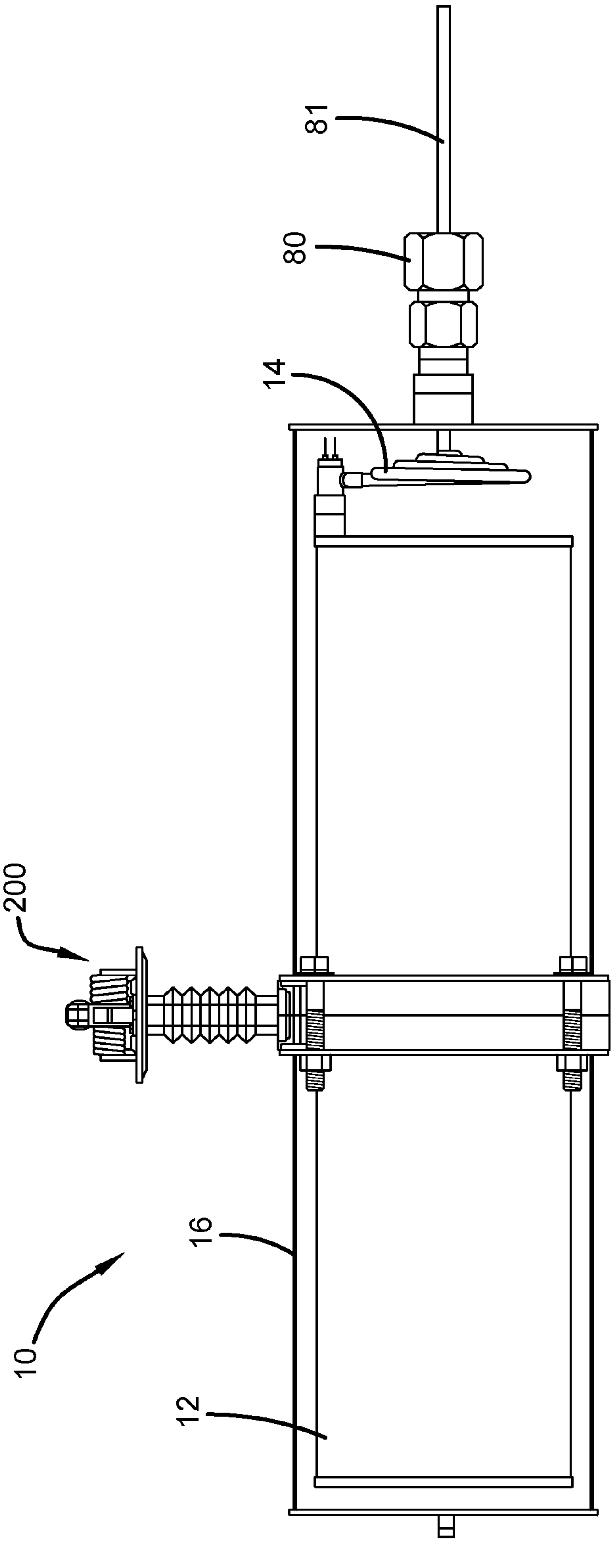
FIG. 1 is a cross-sectional view of an exemplary flight storage system in accordance with some aspects of the present disclosure.

FIG. 1 illustrates a cross-sectional view along a length of the exemplary flight storage system 10. The system 10 consists of three main subassemblies: inner tank 12, vacuum jacket 16, and tank interface flange subassembly 200. The system 10 also includes a heat exchanger 14 that is in fluid communication with the inner tank 12, a compression fitting 80, and a heat exchanger outlet tube 81. The storage system 10 is configured to store high specific energy fuel such as liquid hydrogen, or other cryogenic fluids, for energy for power use.

Figure 2:
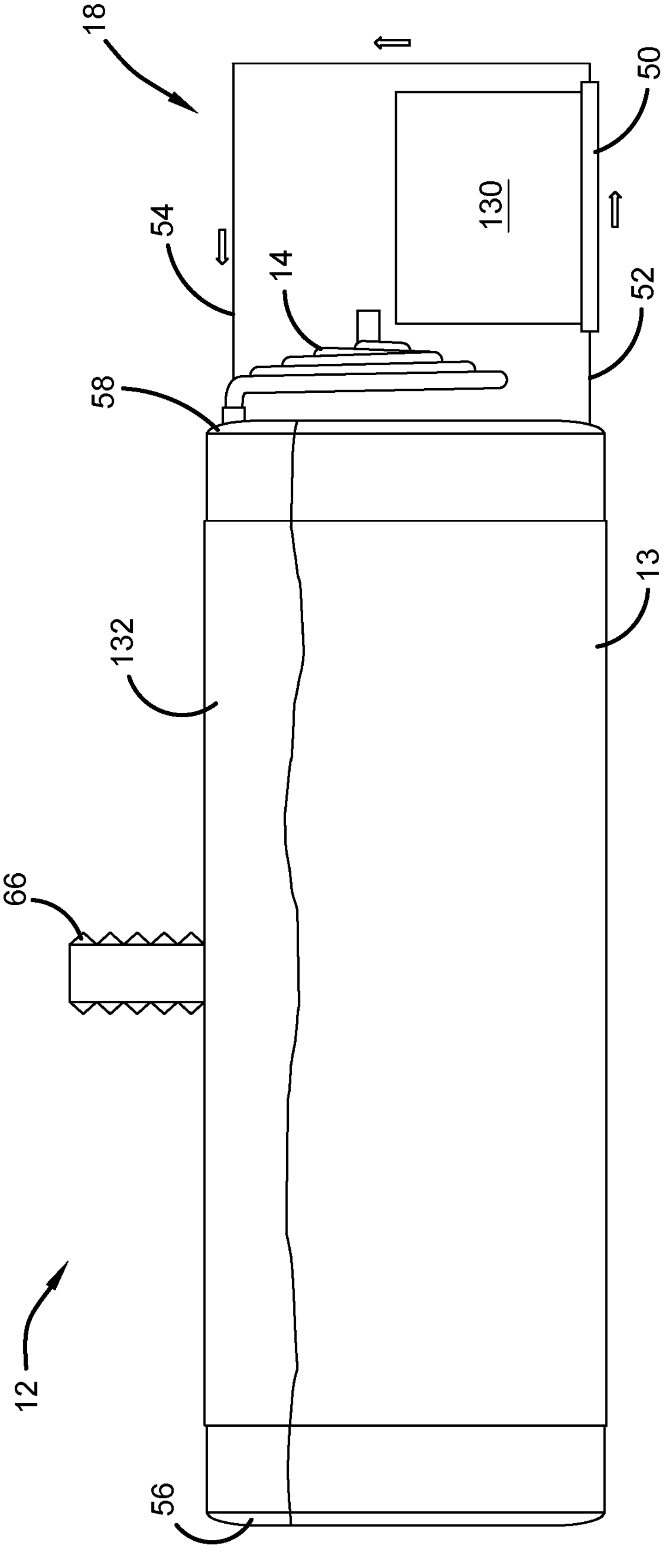
FIG. 2 is a side view of the exemplary flight storage system of FIG. 1 with an associated cooling assembly in accordance with some aspects of the present disclosure.
Figure 3A:
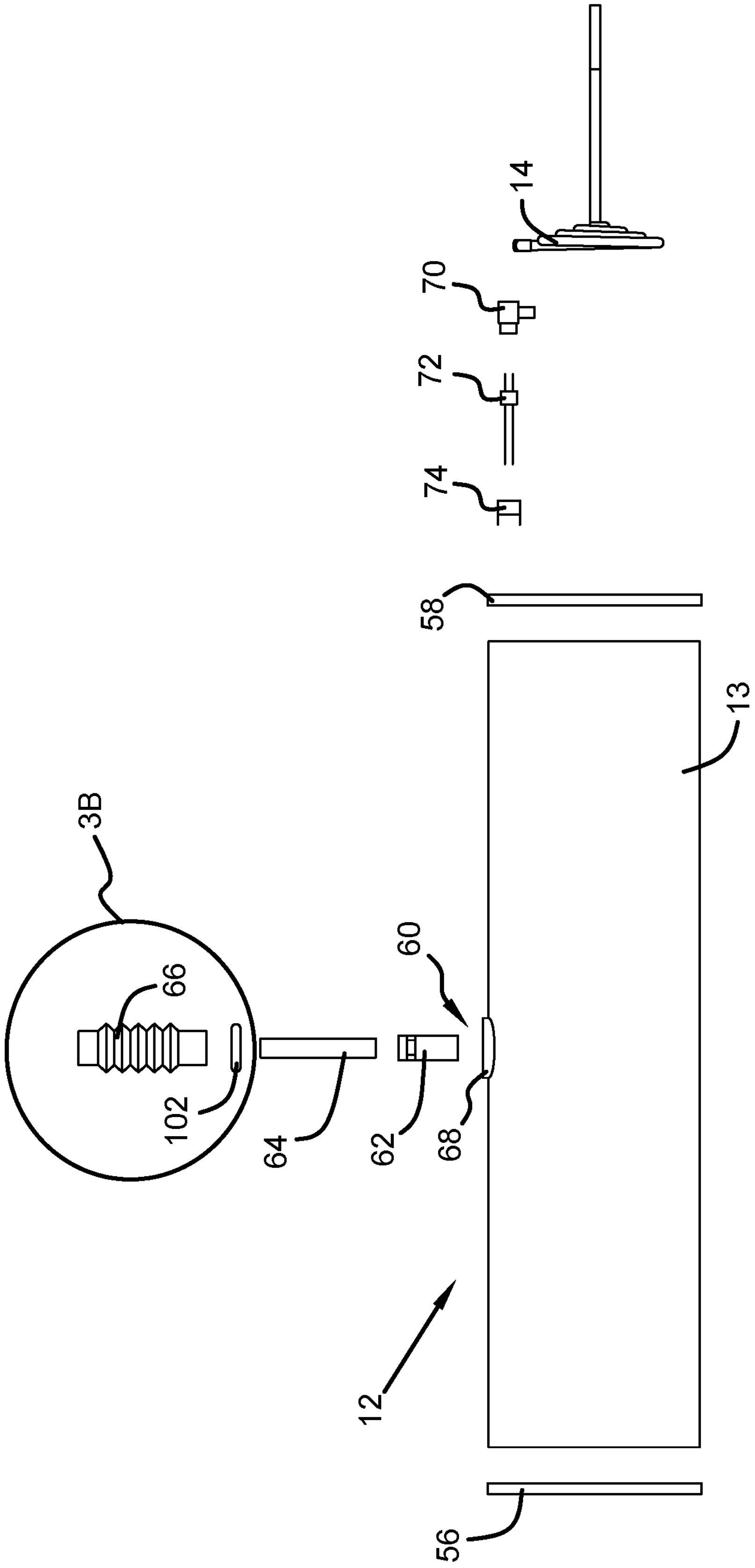
FIG. 3A is an exploded view of an inner tank in accordance with some aspects of the present disclosure.

FIGS. 2 and 3A illustrate side and exploded views of the inner tank 12 and heat exchanger 14 (vacuum jacket 16 removed).

The inner tank 12 is a lightweight pressure vessel boundary specifically designed with metallic materials (e.g., aluminum) that are compatible with liquid hydrogen and can hold from 1 to 6.8 atmospheres (0 to 100 psig) of pressure. The inner tank 12 may include a tank body 13, a first end cap 56, and a second end cap 58. The tank body 13 is preferably cylindrical in shape and preferably made of stainless steel, more preferably aluminum, more preferably titanium for storing the liquid hydrogen. The end caps 56, 58 may be made of a lightweight metal such as aluminum or titanium.

Figure 3B:
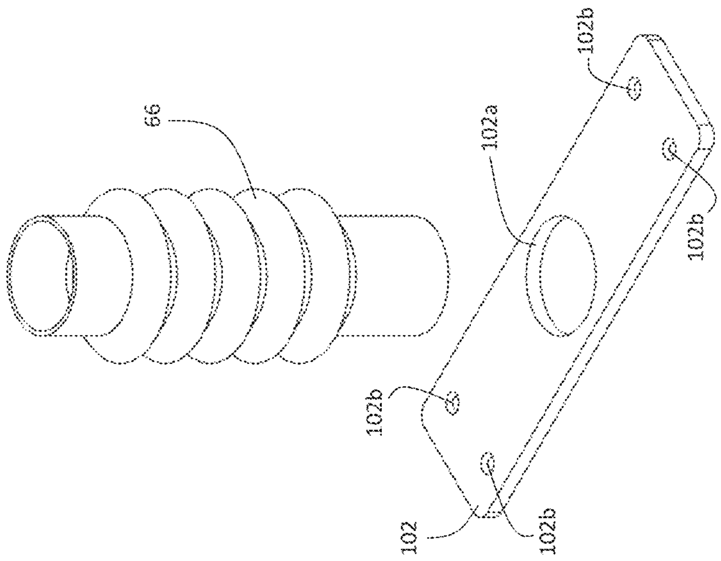
FIG. 3B is a magnified view of the bellows and vacuum plate of FIG. 3A.

To interact with the tank interface flange subassembly 200 (see FIG. 1), the inner tank 12 may have an aperture 60 on the surface of the tank body 13 to which a liquid fill tube bi-metallic fitting 62 is affixed (e.g., welded). A washer 68 may be attached (e.g., welded) at the aperture 60 to add strength to the interface between the tank body 13 and the liquid fill tube fitting 62. The liquid fill tube bi-metallic fitting 62 may be in fluid communication with a fill tube 64 for liquid fuel to flow into the inner tank 12 through the fitting 62 and fill tube 64. An outer bellows 66 may be attached (e.g., welded) to a vacuum jacket connection plate 102 to effectively fluidly connect the bellows 66 to the vacuum jacket 16, as described in detail below. As shown in FIG. 3B, the bellows 66 may be attached (e.g., welded) at an aperture 102*a* of the vacuum jacket connection plate 102. The outer bellows 66 circumscribes the fitting 62 and/or the fill tube 64 with an annular air/vacuum annular gap therebetween. That is, the fitting 62 and/or the fill tube 64 fit inside the outer bellow 66 and the aperture 102*a* of the vacuum jacket connection plate 102 with an air/vacuum gap between a) the fitting 62 and/or the fill tube 64 and b) the outer bellow 66 and the aperture 102*a*. Vacuum may effectively be pulled from the vacuum jacket 16 through that air/vacuum gap. The outer bellows 66 may be filled with insulation designed for use in vacuum.

The fill tube 64 may be constructed from a material that has a lower thermal conductivity than aluminum, such as stainless steel, to reduce heat conduction from the inner tank 12. The tube 64 may be kept relatively short to reduce weight of the overall system 10. The bi-metallic transition fitting 62 serves as interface between the two different metals and enables the optimization of light-weight and low heat leak, while containing liquid hydrogen at 21 K (−421° F.) under pressure.

The heat exchanger 14 is preferably constructed from high-thermal conductivity copper. The heat exchanger 14 is connected to the inner tank 12 by a discharge fitting tee 70 that connects a feed through 72 to a bi-metallic fitting 74 that connects to the second end cap 58. When pressurized, the inner vessel 12 will discharge ullage gas into the heat exchanger 14. The tubular heat exchanger 14 is disposed within the vacuum jacket 16 and may be insulated with multi-layer insulation to minimize external heat leak. The heat exchanger 14 may be heated by an electric heater (not shown) to warm the exiting gas. The tubular heat exchanger 14 may be traced with heating wire, preferably made from nichrome, that is connected to an external power supply and controller that provides an external source of heat to the coiled heat exchanger 14. The heat can be controlled to control the discharge vapor temperature at the outlet of the heat exchanger 14. The heater wire may be passed out of the vacuum jacket 16 through the removable compression fitting 80 along with the heat exchanger outlet tube 81. See FIG. 1. Other heating methods may be contemplated including induction or using flexible resistive heater strips attached to the heater tubes.

FIG. 2 also illustrates a cooling assembly 18 that may use the flow of liquid hydrogen and the available heat capacity for cooling onboard devices such as, for example, critical sensor packages. The cooling assembly 18 includes a cold plate heat exchanger 50, a bottom drain tube 52, and a vapor return line 54. The bottom drain tube 52 and the vapor return line 54 are fluidly connected to the inner tank 12 and the cold plate heat exchanger 50 such that liquid hydrogen from the inner tank 12 feeds out through the bottom drain tube 52 and into the cold plate heat exchanger 50. The vaporized hydrogen then leaves the cold plate heat exchanger 50 through the vapor return line 54 and back into the ullage space 132 of the inner tank 12.

Figure 4:
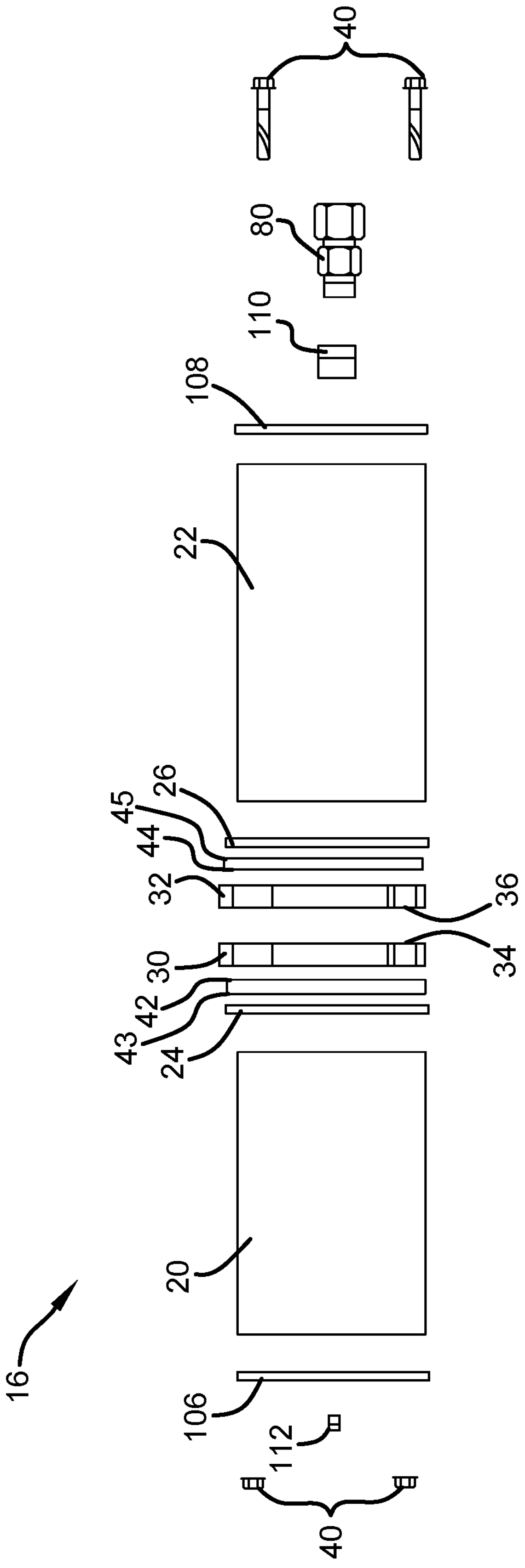
FIG. 4 is an exploded view of an outer jacket assembly in accordance with some aspects of the present disclosure.

FIG. 4 illustrates an exploded view of the outer jacket assembly 16. The outer jacket assembly 16 is formed of three main assemblies: 1) a first jacket assembly formed by the first jacket cylinder 20, the first end cap 106 and the first flange 24, 2) a second jacket assembly formed by the second jacket cylinder 22, the second end cap 108 and the second flange 26, and 3) an interface assembly formed by the first connector body 30 and a second connector body 32.

The outer jacket assembly 16 may further include a bi-metallic transition fitting 110 to connect the compression fitting 80 to the second end cap 108. The compression fitting 80 may be a Conax Technologies commercially available compression fitting for passing sensor and heater power wires. The transition fitting 110 may be a bi-metallic transition fitting to connect the stainless-steel compression fitting 80 to the aluminum end cap 108. The first end cap 106 may include a vacuum jacket pump out port 112 used for removing air from the vacuum jacket 16. The outer vacuum jacket assembly may be insulated with an appropriate insulation designed to operate in a vacuum. For example, the outer vacuum jacket may be insulated with multilayer insulation. The insulation may be easily removed and replaced because of the removable enclosures described herein.

The first end cap 106 and the first flange 24 attach (e.g., welded) to the first cylinder 20 while the second end cap 108 and second flange 26 attach (e.g., welded) to the second cylinder 22. The first and second end caps 106, 108 may be formed as flat disks or may be dished or semi-hemispherical in shape. As described in detail below, the first connector body 30 is attached to the second connector body 32. When the system 10 is assembled, the first connector body 30 is operably connected to the first jacket cylinder 20 and the second connector body 32 is operably connected to the second jacket cylinder 22. The outer jacket assembly 16 includes a first sealing ring 42 disposed between the first flange 24 and the first connector body 30, and a second sealing ring 44 disposed between the second flange 26 and the second connector body 32. The first and second sealing rings 42, 44 may be adhered to the first and second connector bodies 30, 32, respectively, by applying cryogenic rated epoxy. At least one fastener 40 may connect the first and second flanges 24, 26 to the first and second connector bodies 30, 32 and, thus, to each other.

The first and second flanges 24, 26 and first and second seal rings 42, 44 may have machined-in serrations for sealing on gaskets 43, 45 therebetween. The serrations may either be spiral or concentric and configured to dig into the between gaskets 43, 45 to form a seal. The gaskets 43, 45 may preferably be polytetrafluoroethylene (PTFE) gaskets. The first and second connector bodies 30, 32 may be made from high-pressure laminate such as garolite, G-10/FR-4, low-thermal conductivity type material. Fasteners 40 may be made of light-weight fiberglass. The first and second jacket cylinders 20, 22 may be made from durable, light-weight aluminum, and can be made in different lengths to accommodate various length inner tank assemblies and to accommodate any additional items to be cooled inside the vacuum environment such as, for example, sensors flown on the fight vehicle as payloads. The end caps 106, 108 may also be made from durable, light-weight aluminum.

The first connector body 30 has a first face 34, and the second connector body 32 has a second face 36. When connected together, the first face 34 of the first connector body 30 abuts the second face 36 of the second connector body 32.

Figure 5:
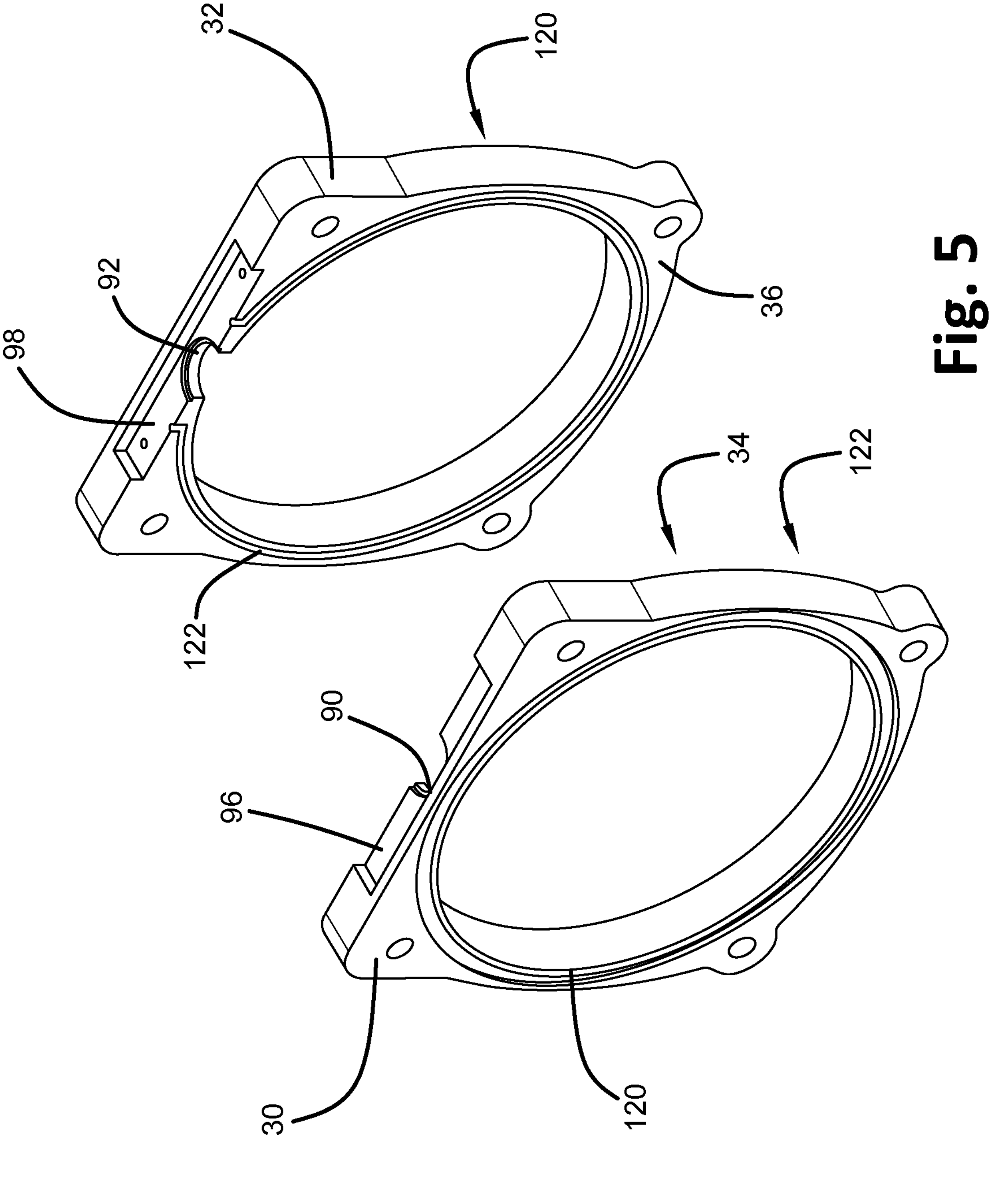
FIG. 5 is a perspective view of a first and second connector bodies in accordance with some aspects of the present disclosure.
Figure 6:
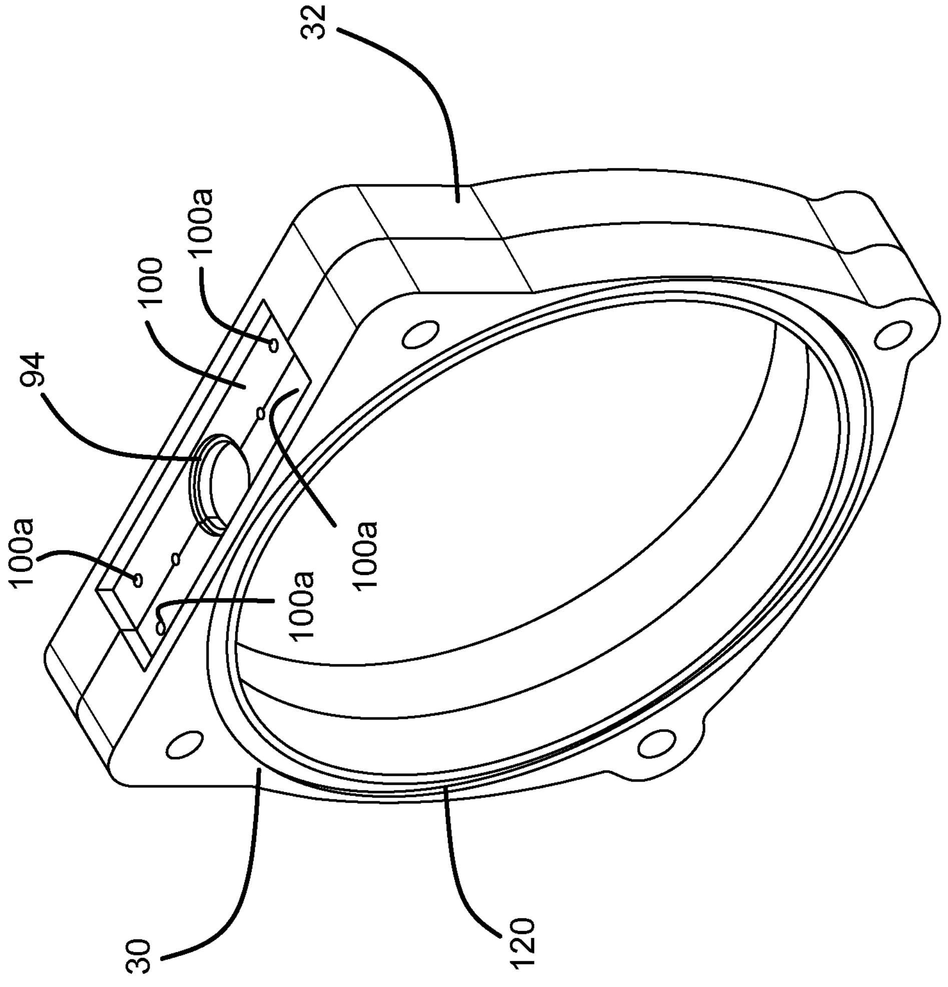
FIG. 6 is a perspective exploded view of the first and second connector bodies of FIG. 5.

FIGS. 5 and 6 illustrate the first and second connector bodies 30, 32 disconnected and connected, respectively. The first and second connector bodies 30, 32 may be epoxied together by applying cryogenic rated epoxy in the grooves 122 (e.g., two-part Stycast 8250FT epoxy with Catalyst 9). The serrated seal rings 42, 44 (FIG. 4) may be epoxied into the first and second connector bodies 30, 32 using the same cryogenic epoxy in grooves 120.

The first connector body 30 may have a first semicircular opening 90, and the second connector body 32 a corresponding second semicircular opening 92. In the connected state the first and second semicircular openings 90, 92 form a circular aperture 94. The bi-metallic fitting 62 and/or the fill tube 64 fit inside the circular aperture 94 (and inside the aperture 102*a* of the vacuum jacket connection plate 102). The first connector body 30 may further have a first depression 96 and the second connector body 32 may have a second depression 98. When the first connector body and the second connector body 32 are connected, the depressions 96, 98 form a plate cavity 100 circumscribing the circular aperture 94. The vacuum jacket connection plate 102 (see FIGS. 3A and 3B) may be received and fastened into the plate cavity 100 (see matching fastener holes 102*b* of the plate 102 in FIG. 3B and fastener holes 100*a* of the plate cavity 100 in FIG. 6) such that the aperture 102*a* aligns with the aperture 94. The inner tank to vacuum jacket connection plate 102 may be inserted into the plate cavity 100, secured with screws, and cryogenic epoxy used to seal the connection plate 102 to the plate cavity 100. This sealing technique completes the vacuum seal around the inner tank and is a key feature of the design enabling the combination of different materials to be used to minimize environmental heat leak to the liquid hydrogen and overall mass of the flight storage system.

The inner tank 12, the heat exchanger 14, and the cooling assembly 18 are all encased when the outer jacket assembly 16 is in the connected state. When in the connected state, the outer jacket assembly 16 creates a vacuum seal around the inner tank 12, heat exchanger 14, and the cooling assembly 18.

The outer jacket assembly 16 is configured such that the first jacket cylinder 20 and the second jacket cylinder 22 are independently removable to access the inner tank 12. The independently removable jacket cylinders 20, 22 are advantageous because it allows access to the inner tank 12 and its associated components without having to dismantle the entire flight storage system 10. This cuts down on cost and time of maintenance of the flight storage system 10. Many conventional storage systems are constructed from a solid outer jacket that cannot be easily disassembled to access the inner tank.

Returning to FIG. 2, the cooling assembly 18 may include a sensor or a sensor package 130 containing a plurality of or a combination of electrical measurement devices, such as quantum communications devices, gas sampling devices, or cryogenically cooled sensors which are thermally connected to the cold plate heat exchanger 50. Liquid hydrogen from the inner tank 12 may be gravity fed from the bottom drain tube 52 and into cold plate heat exchanger 50. The cold plate heat exchanger 50 may contain internal flow passages that are designed to meet the sensor package 130 cooling requirements. Vaporized hydrogen may then leave the cold plate heat exchanger 50 through the vapor return line 54 that discharges into the ullage space 132 of the inner tank 12. The vapor may then be discharged out of the inner tank 12 through the heat exchanger 14. The half of the jacket cylinder 20, 22 that surrounds the cooling assembly 18 may be constructed to accommodate electrical, mechanical, optical, or fluid feed throughs. The half of the jacket cylinder 20, 22 that surrounds the cooling assembly 18 may be removed for easily installation or maintenance of the cooling assembly.

Figure 7:
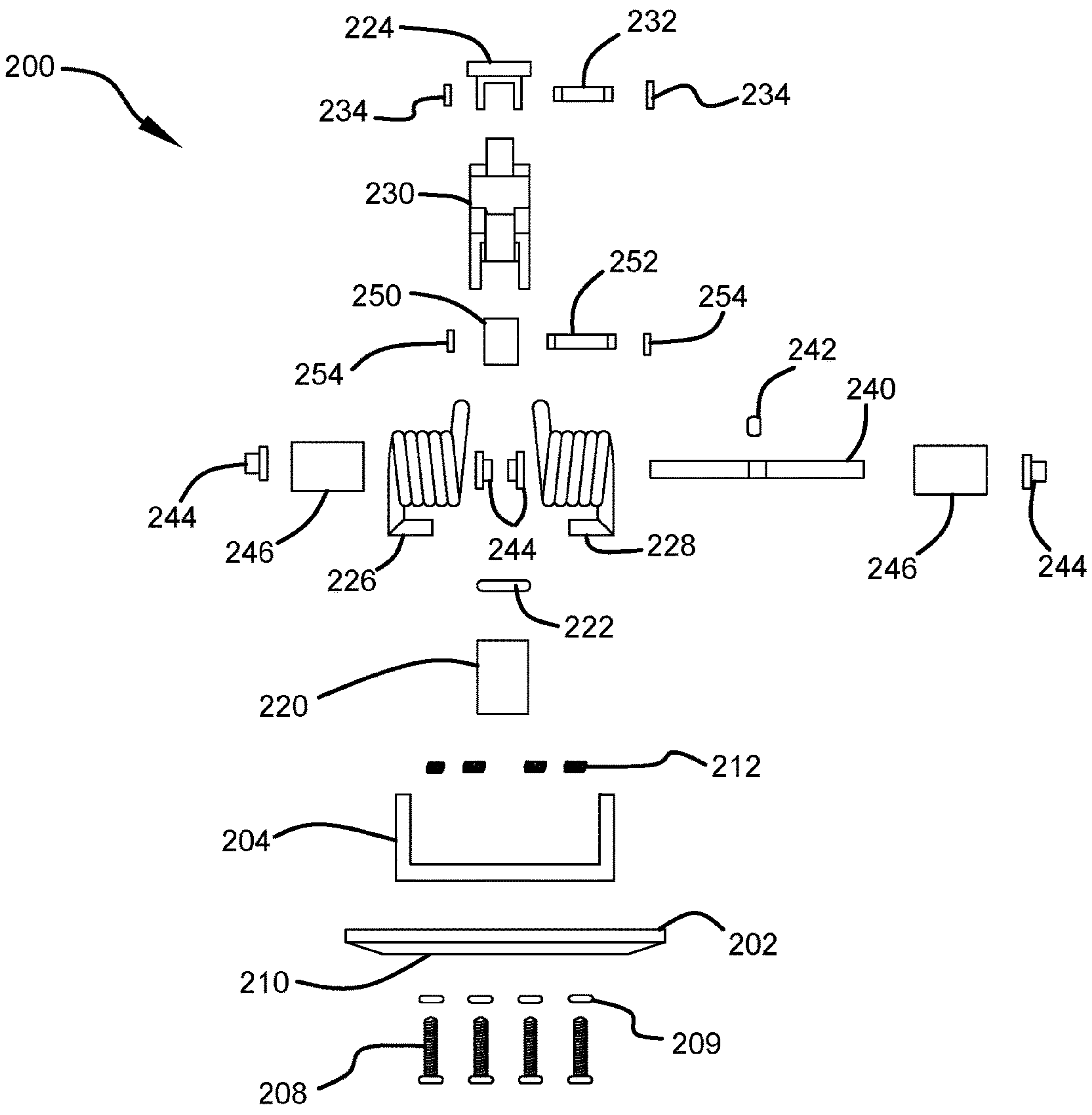
FIG. 7 is an exploded view of a tank interface flange subassembly in accordance with some aspects of the present disclosure.

FIG. 7 depicts a tank interface flange subassembly 200, portions of which have been disclosed in U.S. Pat. Nos. 10,773,822 and 10,981,666, which are both hereby incorporated by reference. The interface flange subassembly 200 may include a tank interface flange 202 that is typically made of stainless steel and is used to interface with a Liquid Hydrogen Direct Fill System disclosed in U.S. patent application Ser. No. 17/578,099, which is hereby incorporated by reference. The pivot stand 204 is attached to the tank interface flange 200 using bolts 208, washers 209, lock washers 210, and nuts 212. The tank interference flange subassembly 200 may include a fill tube extension 220 made of stainless steel and welded into the tank interface flange 202. A knife edge seal 222 is welded to the end of the fill tube extension 220. The tank interference flange subassembly 200 may further include a cap 224 which seals the inner tank 12 by being compressed on to the onto the knife edge seal 222 using the force from a first torsion spring 226 and a second torsion spring 228. The cap 224 may be attached to a pivot lever 230 by a dowel pin 232 and a plurality of retainer rings 234. The pivot lever 230 may be held in place onto the pivot stand 202 using a dowel pin 240, a set screw 242, and a plurality of PTFE sleeve bearings 244. The springs 226, 228 may be supported by spring spacers 246. The pivot lever 230 may be mechanically controlled by a plunger on the Direct Fill System that pushes down on a roller 250, which is held to the pivot lever 230 with a dowel pin 252 and retainer rings 254.

Figure 8:
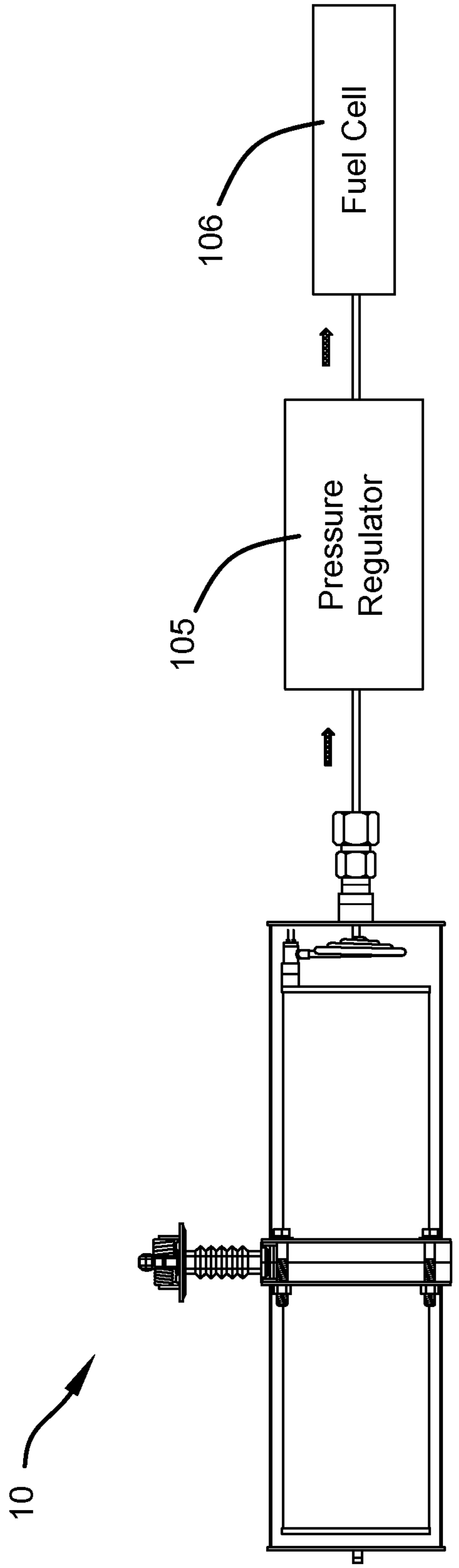
FIG. 8 is a schematic view of a flight power system which includes the flight storage system of FIG. 1.

FIG. 8 depicts the flight storage system 10 in fluid communication with a pressure regulator 300 and a fuel cell 400. The arrows show the flow of the hydrogen gas that is discharged from the flight storage system 10 down the line through the pressure regulator 300 and then into the fuel cell 400. The pressure regulator 300 regulates the pressure from the flight storage system 10 from 100 psig down to approximately 10 psig. The regulated pressure is then transferred to the fuel cell 400. The fuel cell 400 converts the hydrogen with oxygen, which is typically from the air, to produce electricity and water as the product of the reaction to generate power.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An “operable connection,” or a connection by which entities are “operably connected,” is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A system for storing a cryogenic fluid and discharging a vapor comprising:
- an inner tank;
- a heat exchanger in fluid communication with the inner tank;
- a cooling assembly including:
  - a plate heat exchanger;
  - a bottom drain tube and a vapor return line fluidly connected to the inner tank and the plate heat exchanger such that liquid hydrogen from the inner tank is configured to feed out the bottom drain tube and into the plate heat exchanger and vaporized hydrogen is configured to leave the plate heat exchanger through the vapor return line to the inner tank;
- an outer jacket assembly including:
  - a first jacket cylinder and a second jacket cylinder;
  - a first flange and a second flange, wherein the first flange is affixed to the first jacket cylinder and the second flange is affixed to the second jacket cylinder; and
  - a first connector body and second connector body, wherein the first connector body has a first face, and the second connector body has a second face, the connector bodies are configured such that they are disposed between the first and second flanges, when in a connected state the first face of the first connector body abuts the second face of the second connector body and at least one fastener connects the first and second flanges and the first and second connector bodies together; and
- a first sealing ring disposed between the first flange and first connector body, and a second sealing ring disposed between the second flange and second connector body,
- wherein the inner tank, the heat exchanger, and the cooling assembly are encased by the outer jacket assembly.

2. A system for storing a cryogenic fluid and discharging a vapor comprising:
- an inner tank;
- a heat exchanger in fluid communication with the inner tank; and
- an outer jacket assembly including:
  - a first jacket cylinder and a second jacket cylinder;
  - a first flange and a second flange, wherein the first flange is affixed to the first jacket cylinder and the second flange is affixed to the second jacket cylinder; and
  - a first connector body and second connector body, wherein the first connector body has a first face, and the second connector body has a second face, the connector bodies are configured such that they are disposed between the first and second flanges, when in a connected state the first face of the first connector body abuts the second face of the second connector body and at least one fastener connects the first and second flanges and the first and second connector bodies together; and
  - a first sealing ring disposed between the first flange and first connector body, and a second sealing ring disposed between the second flange and second connector body.

3. The system for storing the cryogenic fluid and discharging the vapor of claim 2, wherein the first and second connector bodies in the connected state are adhered together by a cryogenic rated epoxy.

4. The system for storing the cryogenic fluid and discharging the vapor of claim 2, wherein in the connected state the outer jacket assembly is configured to create a vacuum seal around the inner tank.

5. The system for storing the cryogenic fluid and discharging the vapor of claim 2, wherein the first connector body has a first semicircular opening, and the second connector body has a corresponding second semicircular opening.

6. The system for storing the cryogenic fluid and discharging the vapor of claim 2, wherein the first connector body has a first semicircular opening, and the second connector body has a corresponding second semicircular opening, wherein in the connected state the first semicircular opening and second semicircular opening form a circular aperture.

7. The system for storing the cryogenic fluid and discharging the vapor of claim 2, wherein the first connector body has a first semicircular opening and a first depression, and the second connector body has a corresponding second semicircular opening and second depression, wherein in the connected state the first semicircular opening and second semicircular opening form a circular aperture and the first and second depression form a plate cavity circumscribing the circular aperture.

8. The system for storing the cryogenic fluid and discharging the vapor of claim 2, wherein the first connector body has a first semicircular opening and a first depression, and the second connector body has a corresponding second semicircular opening and second depression, wherein in the connected state the first semicircular opening and second semicircular opening form a circular aperture and the first and second depression form a plate cavity circumscribing the circular aperture, wherein the plate cavity receives a vacuum jacket connection plate having formed thereon a fill tube receiving aperture for receiving a fill tube.

9. The system for storing the cryogenic fluid and discharging the vapor of claim 2, wherein the first connector body has a first semicircular opening and a first depression, and the second connector body has a corresponding second semicircular opening and second depression, wherein in the connected state the first semicircular opening and second semicircular opening form a circular aperture and the first and second depression form a plate cavity circumscribing the circular aperture, wherein the plate cavity receives a vacuum jacket connection plate having formed thereon a fill tube receiving aperture that aligns with the circular aperture, a bellows is operably connected to the vacuum jacket connection plate circumscribing the fill tube receiving aperture, a fill tube disposed within the bellows and the fill tube receiving aperture, wherein the fill tube is in fluid communication with the inner tank and the bellows is in fluid communication with the outer jacket assembly.

10. The system for storing the cryogenic fluid and discharging the vapor of claim 2, wherein the outer jacket assembly is configured such that the first jacket cylinder, the second jacket cylinder, or both are independently removable to access the inner tank.

11. The system for storing the cryogenic fluid and discharging the vapor of claim 2, wherein the first and second connector bodies are comprised of a high-pressure laminate.

12. The system for storing the cryogenic fluid and discharging the vapor of claim 2, wherein the inner tank and tubular heat exchanger are encased by the outer jacket assembly.

13. The system for storing the cryogenic fluid and discharging the vapor of claim 2, wherein the first and second sealing rings are serrated, wherein the first and second flanges include machined in serrations for sealing on a first and second gasket, respectively.

14. The system for storing the cryogenic fluid and discharging the vapor of claim 2, comprising a cooling assembly including:

- a plate heat exchanger;
- a bottom drain tube and a vapor return line fluidly connected to the inner tank and the plate heat exchanger such that liquid hydrogen from the inner tank is configured to feed out the bottom drain tube and into the plate heat exchanger and vaporized hydrogen is configured to leave the plate heat exchanger through the vapor return line to the inner tank.

15. A system for storing a cryogenic fluid and discharging a vapor comprising:

- an inner tank;
- a heat exchanger in fluid communication with the inner tank;
- an outer jacket assembly including:
  - a first jacket cylinder and a second jacket cylinder;
  - a first flange and a second flange, wherein the first flange is affixed to the first jacket cylinder and the second flange is affixed to the second jacket cylinder; and
  - a first sealing ring disposed between the first flange and a first connector body, and a second sealing ring disposed between the second flange and a second connector body,
  - wherein both the first and second sealing rings are positioned between the first jacket cylinder and the second jacket cylinder;
  - wherein the inner tank and the heat exchanger are encased by the outer jacket assembly.

16. The system for storing the cryogenic fluid and discharging the vapor of claim 15, comprising:

- a cooling assembly in fluid communication with the inner tank, the cooling assembly including:
  - a drain tube connected to the inner tank at a lower portion of the inner tank;
  - a plate heat exchanger that is configured to receive cryogenic fluid from the drain tube and produce a vapor; and
  - a vapor return line that is configured to return the vapor from the plate heat exchanger to an upper portion of the inner tank,
- wherein the cooling assembly is encased by the outer jacket assembly.

17. The system for storing the cryogenic fluid and discharging the vapor of claim 16, comprising a sensor thermally connected to the plate heat exchanger, wherein the inner tank, the sensor, and the cooling assembly are encased by the outer jacket assembly.

18. The system for storing the cryogenic fluid and discharging the vapor of claim 17, wherein when in a connected state the outer jacket assembly is configured to create a vacuum seal around the inner tank, the sensor, and the cooling assembly.

19. The system for storing the cryogenic fluid and discharging the vapor of claim 17, wherein the sensor is a sensor package containing a plurality of or a combination of devices selected from quantum communications devices, gas sampling devices, or cryogenically cooled sensors.

20. The system for storing the cryogenic fluid and discharging the vapor of claim 15, wherein the first and second connector bodies are connectable and in a connected state are adhered together by a cryogenic rated epoxy.

21. A system for storing a cryogenic fluid and discharging a vapor comprising:

- an inner tank;
- a fitting or tube;
- a heat exchanger in fluid communication with the inner tank;
- a bellows; and
- an outer jacket assembly within which the inner tank and the heat exchanger are disposed, the outer jacket assembly including:
  - a first jacket portion and a second jacket portion;
  - a connector body configured to operably connect between the first jacket portion and the second jacket portion and having an aperture operably connected to the bellows such that the fitting or tube passes through the aperture and the bellows with an annular gap therebetween, the bellows in fluid communication with the outer jacket assembly through the annular gap, and the fitting or tube in fluid communication with the inner tank.

* * * * *